(No Model.) 3 Sheets—Sheet 2.
J. H. BLESSING.
APPARATUS FOR PURIFYING WATER.
No. 482,515. Patented Sept. 13, 1892.
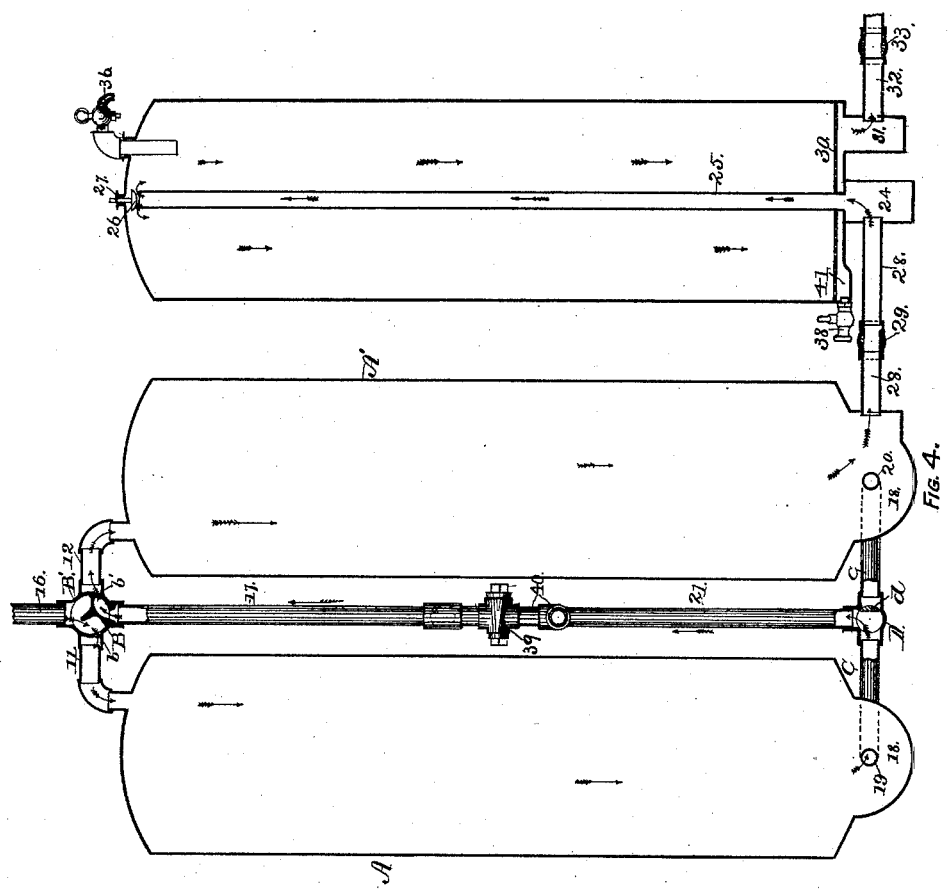
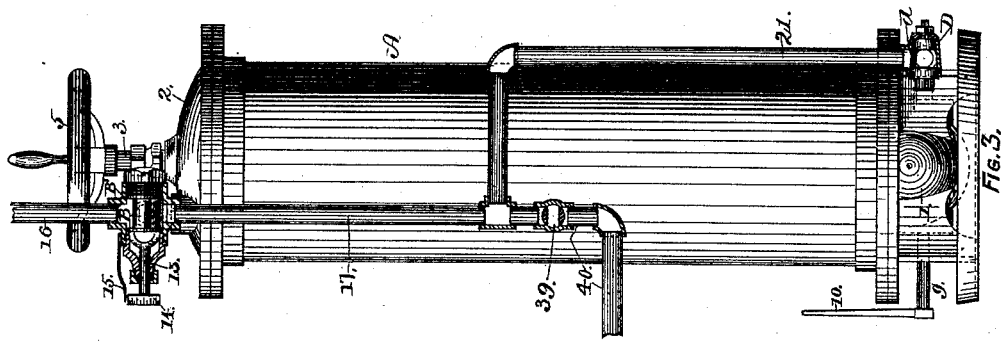
Witnesses:
S. B. Brewer,
H. V. Scattergood.
Inventor:
JAMES H. BLESSING
by William H. Low,
Attorney.

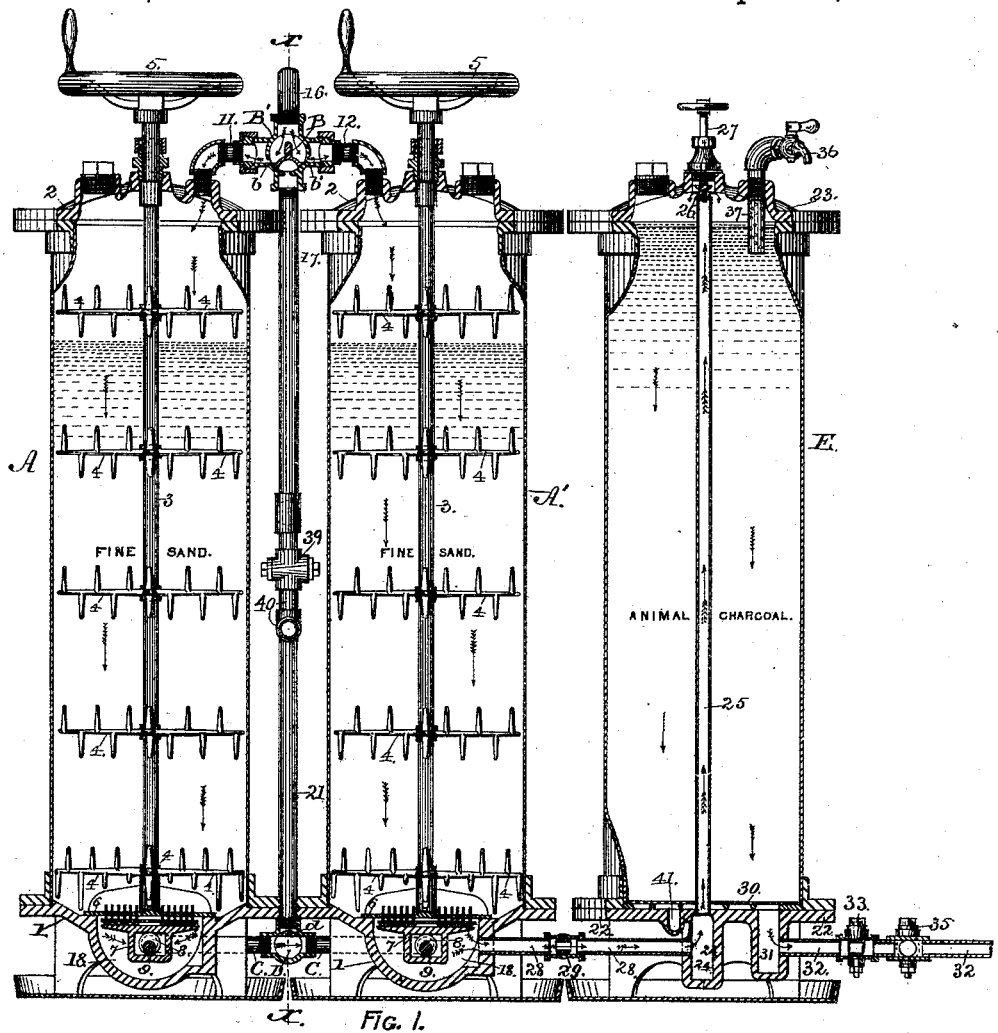

(No Model.) 3 Sheets—Sheet 3.
J. H. BLESSING.
APPARATUS FOR PURIFYING WATER.
No. 482,515. Patented Sept. 13, 1892.
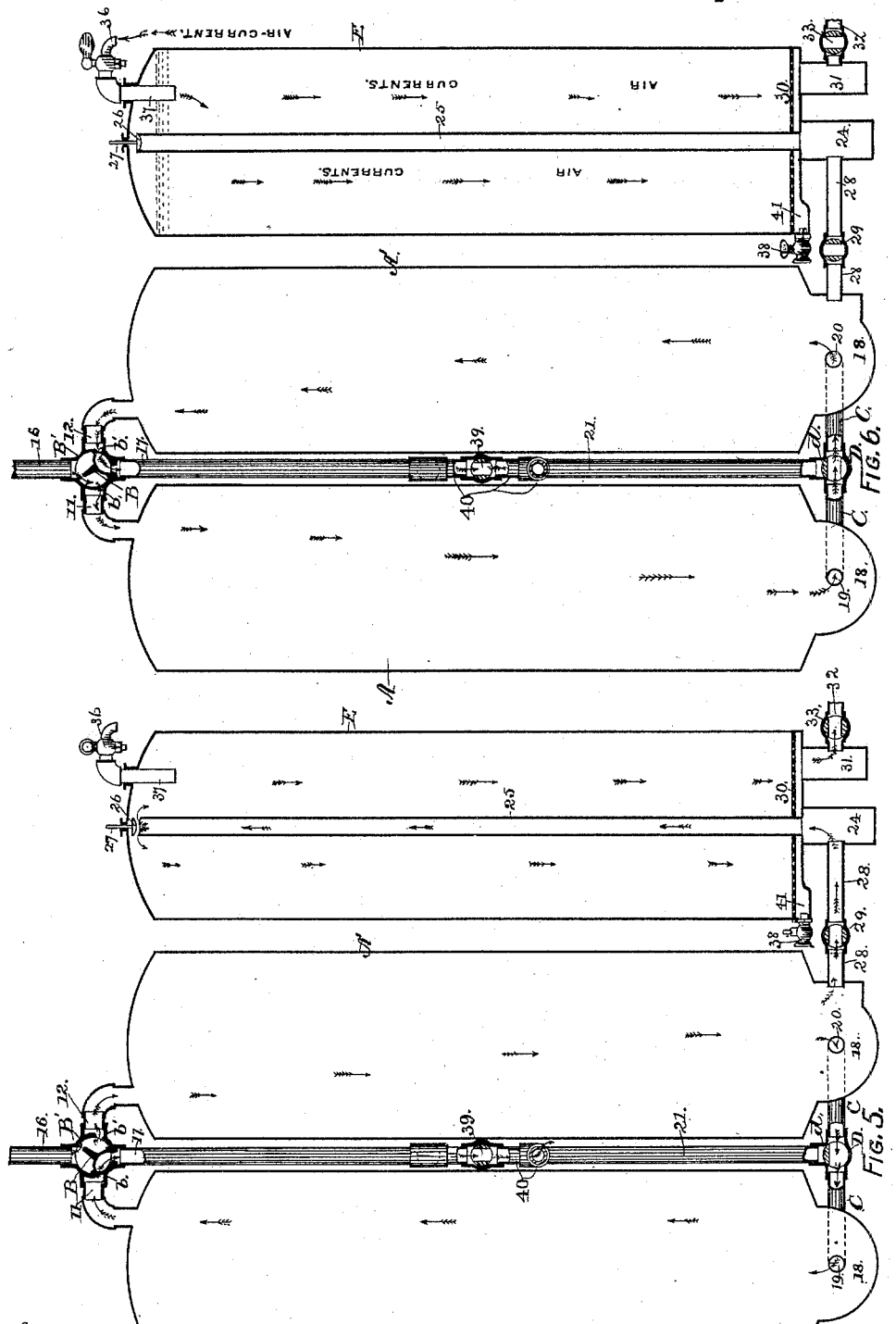
Witnesses:
S. B. Brewer,
H. V. Scattergood.
Inventor:
JAMES H. BLESSING,
by William H. Low,
Attorney.
THE NORRIS PETERS CO., PHOTO-LITHO., WASHINGTON, D. C.

UNITED STATES PATENT OFFICE.

JAMES H. BLESSING, OF ALBANY, ASSIGNOR TO THE NEW YORK FILTER COMPANY, OF NEW YORK, N. Y.

APPARATUS FOR PURIFYING WATER.

SPECIFICATION forming part of Letters Patent No. 482,515, dated September 13, 1892.

Application filed August 25, 1887. Serial No. 247,814. (No model.)

*To all whom it may concern:*

Be it known that I, JAMES H. BLESSING, of the city and county of Albany, and State of New York, have invented new and useful Improvements in Apparatus for Purifying Water, of which the following is a specification.

This invention relates to improvements on the water-purifying apparatus for which Letters Patent of the United States Nos. 352,943 and 352,944 were granted to me November 23, 1886; and the objects of this present invention are to render the apparatus more efficient in its operation and to afford better facilities for cleansing and renovating different parts of the apparatus. These objects I attain by the mechanism illustrated in the accompanying drawings, which are herein referred to, and form part of this specification, and in which—

Figure 1 is a longitudinal section of my apparatus with some of the parts shown in elevation. Fig. 2 is a plan view. Fig. 3 is a transverse vertical section at the line X X, and Figs. 4, 5, and 6 are skeleton sections illustrating the different ways of operating my apparatus.

This apparatus consists of three separate and distinct purifying-chambers, two of which are for effecting a mechanical purification of the water by removing the impurities which are held in suspension and the other for effecting a chemical purification by extracting the impurities which are held in solution by the water, the said chambers being connected together by means of pipes provided with valves and cocks which are so arranged that the water can at the option of an attendant be forced to pass through the apparatus in either of the following-described courses: first, by passing downward through both of the mechanical purifying-chambers and then downward through the chemical purifying-chamber into the delivery-pipe; second, by passing downward through both of the mechanical purifying-chambers and thence directly into the delivery-pipe without passing through the chemical purifying-chamber; third, by first passing downward through the first mechanical chamber, then upward through an intermediate connecting-pipe into the upper part of the second mechanical purifying-chamber, then downward through the latter, and finally through the chemical purifying-chamber, thereby obtaining a continuous purification of the water through all the purifying-chambers in succession, and, fourth, by passing downward through either one of the mechanical purifying-chambers and upward through the other for the purpose of washing out the deposited impurities from the filtering material contained in the latter and discharging said impurities and the contaminated water into a sewer or other suitable means of drainage.

As represented in the drawings, the primary filtering-chambers, or those in which the mechanical purification of the water is effected, are formed by two cylinders A and A', which are secured to base-pieces 1 and are covered by bonnets 2, so as to form water-tight receptacles. Said filtering-chambers are nearly filled with a granular filtering material, preferably composed of a sharp and moderately-fine beach-sand, and in order to effect a thorough cleansing of said material each of said filtering-chambers is provided with a revoluble agitator consisting of a vertical shaft 3, provided with a series of radial arms 4 and projecting through a stuffing-box outwardly from the bonnet of the chamber to which it belongs. The projecting end of said shaft is provided with a hand-wheel 5 or other suitable appliance for operating said agitator. The latter and its mode of operation will be found fully described in Letters Patent No. 352,943, hereinbefore referred to. The filtering-bed of each of said filtering-chambers is supported on a perforated percolating-plate 6, which is secured to the upper face of the base-piece 1 of the cylinder in which it is contained, and each perforation in said percolating-plate has a vertically-reciprocating pin fitted therein, the diameter of said pins in respect to the diameter of the holes being such that, while it will prevent the escape of the finest grains of sand, it will permit the water to ooze through the joints between said pins and holes. Said pins are secured in a reciprocating head 7, that is operated by an eccentric 8, secured to a shaft 9, having on its outer end a hand-lever 10, by which said shaft is operated to produce the reciprocating motion, whereby the pins are reciprocated in the perforations of the percolating-plate. Said percolating-plate and pins and their manner of operation will be found fully described in Letters Patent No. 352,944, hereinbefore referred to.

B is an oscillatory valve, which is contained in a valve-casing B', provided with ports $b$ and $b'$, that respectively communicate with the filtering-chambers A and A' through the branch pipes 11 and 12. Said valve is of such length that when fixed in its central position, as shown in Fig. 1, both of the ports in the valve-casing will be open for the passage of water into both filtering-chambers. Said valve is provided with a stem 13, which projects through a stuffing-box at the end of the valve-casing and the outer end of said stem is provided with a graduated hand-wheel 14, by which the valve is operated. A pointer 15 is fixed adjacently to said graduated wheel for the purpose of indicating the position of the valve B in respect to the ports $b$ $b'$—that is to say, to indicate whether both ports are opened, as shown in Fig. 1, or if one is opened and the other closed, and in the latter case which port is opened and which one is closed. A water-supply pipe 16 connects the upper side of said valve-casing with the street-mains or other source of supply, for the purpose of conveying the water into the apparatus. A waste-water pipe 17, which is occasionly used as part of the circulating system of pipes, is connected to the under side of the valve-casing, so that it will at all times be in open communication with the pass-over channel in the under side of the valve B.

C is a circulating-pipe, which connects by means of branch pipes 19 and 20 (shown by dotted lines in Fig. 2) with filtered-water chambers 18 in the base-pieces under the cylinders A and A'. A three-way stop-cock D is inserted in said circulating-pipe at its junction with a pipe 21, which forms a branch from said circulating-pipe to the waste-water pipe 17, as shown in Fig. 3. The turning-plug of said stop-cock is provided with a blank or bar $d$ at one side, which bar, when the turning-plug is fixed in proper position, will shut off the passage into the pipe 21, as shown in Fig. 1, and leave a free communication through the circulating-pipe C, or said turning-plug may be turned into positions where said bar will shut off the communication between either part of the circulating-pipe and the branch pipe 21, while the communication between the other part of the circulating-pipe and the branch pipe 21 remains free and unobstructed.

The chemical purifying-chamber consists of a cylinder E, which is filled with animal charcoal. Said cylinder is secured to a base-piece 22 and is covered by a bonnet 23. The base-piece is provided with a central chamber or pocket 24, from which a standing pipe 25 extends to the upper part of said purifying-chamber, so that the upper end of said pipe will be above the level of the animal charcoal. A valve 26, provided with a screw-stem 27, which passes through the bonnet of said purifying-chamber, is fitted to close the upper end of the standing pipe 25 when occasion requires, as hereinafter explained. The chamber 24 is connected by a pipe 28 with the filtered-water chamber 18 under the cylinder A', and said pipe is provided with an ordinary straight-way stop-cock 29, by which the direct communication between the primary filtering-chambers and the chemical purifying-chamber may be closed for the purpose of removing the bonnet 23 when occasion requires, while the water-pressure is on the apparatus. A finely-perforated diaphragm 30 is fitted into the lower end of the cylinder E for the purpose of preventing the escape of the particles of animal charcoal, and a pocket 31 in the base-piece 22 forms an outlet for the escape of the purified water from said cylinder. An outlet-pipe 32, provided with a stop-cock 33, is inserted in the pocket 31 for the purpose of conveying the purified water to any desired points. A branch pipe 34, provided with a stop-cock 35, forms a connection between the circulating-pipe C and outlet-pipe 32 beyond the stop-cock 33 in the latter, and when the stop-cock 35 is open and the stop-cocks 29 and 33 are closed the filtered water from the primary filtering-chambers or either of them can be carried past the chemical purifying-chamber without entering the latter, pass directly into the outlet-pipe 32, and be conveyed by the latter to any required point of delivery. The cylinder E has at its upper end an air-cock 36, having within said cylinder a strainer 37, which prevents the animal charcoal from being forced through said air-cock when the latter is opened while the water-pressure is maintained in the cylinder E. A petcock 38 is inserted in a channel-way 41 beneath the diaphragm 30, for the purpose of draining all water from the animal charcoal during the process of aerating the latter. Said process of aeration forms the subject-matter of another application filed May 26, 1888, as Serial No. 275,170. The waste-water pipe 17 is provided with a stop-cock 39, whereby said pipe can be shut off from communication with a branch pipe 40, which leads to a sewer or other suitable drainage for carrying off the contaminated water from the apparatus.

As ordinarily used the operation of this apparatus is as follows: The stop-cocks 29 and 33 and valve 26 are open and the stop-cock 35 is closed. The valve B is set, as shown in Fig. 1, so that both ports $b$ and $b'$ will be wide open to admit the inflowing water into both of the primary filtering-chambers in the cylinders A and A'. The water descending through the filtering material contained in said chambers, as indicated by arrows in Fig. 1, is thereby deprived of particles that were held in suspension therein. The filtered water from both of said filtering-chambers is delivered into the filtered-water chamber 18 under the cylinder A', the water from the filtering-chamber in the cylinder A passing through the pipes 19, C, and 20 to reach said filtered-water chamber. From the latter the water passes through the pipes 28 and 25 into the upper part of the cylinder E, and by descending through the animal charcoal contained in said cylinder the impurities that are held in solution are extracted from the water. The purified water is conveyed from the apparatus through the outlet-pipe 32 to any required points of delivery, and the apparatus will continue to operate, as described, so long as the water is drawn therefrom.

As shown in Fig. 4, the apparatus is arranged to produce a continuous purification of the water by passing it through the several cylinders in succession. In this arrangement the valve 26 and stop-cocks 29 and 33 are open, the stop-cocks 35 and 39 are closed, the plug of the stop-cock D is set to leave an open communication through the pipe C between the pipes 19 and 21, but closing the passage between the pipes 20 and 21, and valve B is set, as shown in Fig. 4, so that the port $b$ will alone be open to the interior of the valve-casing B', the pass-over channel in the under side of said valve forming a free communication between the port $b'$ and the waste-water pipe 17. The water first descends through the filtering material in the cylinder A, then ascends through the pipes 19, C, 21, 17, and 12 into the upper part of the cylinder A', and descends through the filtering material in the latter. It next ascends by the pipes 28 and 25 into the upper part of the cylinder E, and after descending through the animal charcoal in the latter is conveyed through the outlet-pipe 32 to any required points of delivery.

As shown in Fig. 5, the apparatus is arranged to effect the cleansing of the filtering material in the cylinder A, and for this purpose the stop-cock 39 is opened, the plug of the stop-cock D is set to close the communication between the pipes C and 21, and the valve B is set to uncover the port $b'$ and form a communication through the pass-over channel in the under side of said valve between the pipes 11 and 17. The water first descends through the filtering material in the cylinder A' and is thereby purified. It then passes through the pipes 20, C, and 19 into the base of the cylinder A, and ascending through the filtering material in said cylinder carries with it the impurities that have been deposited in said material by the descending currents of water that have previously passed therethrough. By the ascending current of water the particles of the filtering material will be loosened and separated and the mass reduced to a condition that will permit the agitator in the cylinder A to be freely rotated. By the rotations of the agitator the particles of the filtering material are stirred up to a sufficient degree to separate therefrom any foreign substance contained therein, which substances can then be readily carried off by the current of water. The impurities and contaminated water pass through the pipes 11, 17, and 40 into a sewer or other suitable drainage. When desired, a portion of the filtered water from the filtering-chamber in the cylinder A in this last-described operation may be diverted from the cylinder A, and after passing through the animal charcoal in the cylinder E, as indicated by arrows in Fig. 5, be conveyed, as hereinbefore described, to any desired points.

As shown in Fig. 6, the apparatus is arranged for cleansing the filtering material in the cylinder A'; but as this operation is identical with the one above described in respect to Fig. 5 a further description of it is considered unnecessary.

In Fig. 6 the cylinder E is shown as adjusted to effect the aeration of the animal charcoal in said cylinder, and during that process the stop-cock 35 should be open, so as to permit the filtered water from the primary filtering-chambers to pass through the outlet-pipe 32 to any point of delivery without passing through the cylinder E.

When the apparatus is arranged to operate in any of the several ways above described, either for purifying the water by passing it through all the cylinders or for cleansing the filtering material in either of the primary filtering-chambers, the cylinder E can be thrown out of action by adjusting the valves and cocks in the manner hereinbefore described.

In Letters Patent No. 402,224, granted to me on the 30th day of April, 1889, I describe a chemical purifying-chamber which, while it performs a like function, presents a different construction from the one which is herein shown and described, and it should be understood that I do not herein claim the earlier construction just referred to.

I claim as my invention—

1. In a water-purifying apparatus, the combination of three cylinders, two of which are primary filtering-chambers and the other a chemical purifying-chamber, a valve B for controlling the direction of the inflowing water into the first two chambers, a three-way stop-cock D, connecting the pipes C and 21, a filtered-water pipe C, connecting with the filtered-water chambers of said primary filtering-chambers and forming a roundabout pipe for conveying the filtered water outside of said chemical purifying-chamber, waste-water pipes 17 and 40, a filtered-water pipe 28, connecting said purifying-chamber with the filtered-water chambers, and a filtered-water outlet-pipe 32, all of said pipes being arranged exteriorly to the apparatus and the pipes 17, 28, 32, and 34 being each provided with a suitable valve for controlling the passage of liquid therethrough, substantially as and for the purpose specified.

2. In a water-purifying apparatus, the combination, with two primary filtering-chambers, of a supply-pipe provided with branches connecting with both of said chambers, a single valve which connects said supply-pipe with both of said branch pipes and is adapted to control the inflow of water into either or both of said chambers, said valve being also adapted to control the inflow of water into one of said chambers and a simultaneous outflow of contaminated water from the other chamber, a passage connecting the discharge end of said chambers directly together, a passage connecting the discharge end of either of said chambers with the inlet end of the other chamber, a third or purifying chamber, a passage connecting the discharge end of the second chamber with the inlet end of the third chamber, and suitable valves for controlling the flow of water through said passages, whereby water may be passed either simultaneously or successively downwardly through the first two chambers and then through the third chamber, as and for the purpose herein specified.

3. In a water-purifying apparatus, the combination, with two primary filtering-chambers, of a supply-pipe provided with branches connecting with both of said chambers, a single valve which connects said supply-pipe with both of said branches and is adapted to control the inflow of water into said chambers, said valve also being adapted to allow an inflow of water into either of said chambers and a simultaneous outflow of water from the other chamber, as herein described, a passage connecting the discharge end of said chambers with each other and with an outlet-passage for the filtered water, a passage connecting the discharge end of either one of said chambers with the inlet end of the other, a third or purifying chamber, a passage connecting the discharge end of the second chamber with the inlet end of the third chamber, a passage connecting the discharge end of the third chamber with the outlet-passage for the filtered water, and suitable valves or cocks for controlling the flow of water through said passages and chambers, whereby water may be passed through either or both of the first two chambers and then directly out through said outlet-passage without passing through the third chamber, as and for the purpose herein specified.

JAMES H. BLESSING.

Witnesses:
WM. F. WHEELOCK,
WM. H. LOW.